(12) United States Patent
Monsaint

(10) Patent No.: US 12,038,098 B2
(45) Date of Patent: Jul. 16, 2024

(54) MANUALLY CONTROLLED ELECTROMAGNETIC ACTUATOR AND PARKING BRAKE VALVE PROVIDED WITH SUCH AN ACTUATOR

(71) Applicant: SAFRAN LANDING SYSTEMS, Velizy-Villacoublay (FR)

(72) Inventor: Laurent Monsaint, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 69 days.

(21) Appl. No.: 17/997,945

(22) PCT Filed: May 4, 2021

(86) PCT No.: PCT/EP2021/061702
§ 371 (c)(1),
(2) Date: Nov. 4, 2022

(87) PCT Pub. No.: WO2021/224241
PCT Pub. Date: Nov. 11, 2021

(65) Prior Publication Data
US 2023/0175606 A1    Jun. 8, 2023

(30) Foreign Application Priority Data
May 5, 2020  (FR) ...................................... 2004471

(51) Int. Cl.
*F16K 31/06*  (2006.01)

(52) U.S. Cl.
CPC ................................ *F16K 31/0679* (2013.01)

(58) Field of Classification Search
CPC .. F16K 31/003; F16K 31/0679; H01F 7/1607; H01F 2007/185
See application file for complete search history.

(56) References Cited

U.S. PATENT DOCUMENTS

| 255,162 | A | * | 3/1882 | Gielow | ............. | F16K 31/52408 251/259 |
| 780,929 | A | * | 1/1905 | Angehr | ............. | F16K 31/52408 251/263 |

(Continued)

FOREIGN PATENT DOCUMENTS

| DE | 10 2010 000 737 A1 | 8/2010 | | |
| FR | 3116165 A1 | * | 5/2022 | ............. B64C 25/42 |

OTHER PUBLICATIONS

English translation of Written Opinion mailed Jul. 21, 2021, issued in corresponding International Application No. PCT/EP2021/061702, filed May 4, 2021, 6 pages.

(Continued)

*Primary Examiner* — Umashankar Venkatesan
(74) *Attorney, Agent, or Firm* — CHRISTENSEN O'CONNOR JOHNSON KINDNESS PLLC

(57) ABSTRACT

A bistable electromagnetic actuator includes a housing extending along an exertion axis of the actuator, two excitation coils arranged inside the housing and having at least one winding around the exertion axis for generating a magnetic control flux, a core that can be moved along the exertion axis and immobilized in two end positions depending on the magnetic flux generated by the coils, an actuating member coupled to the core to form a movable assembly, and a manual control device comprising a drive shaft mounted such that it can rotate about a first axis orthogonal to the exertion axis.
The drive shaft has at least one tooth engaging with at least one first raised part translationally connected to the actuating member such that rotation of the drive shaft generates translational movement of the movable assembly.

7 Claims, 3 Drawing Sheets

(56) References Cited

U.S. PATENT DOCUMENTS

| | | | | |
|---|---|---|---|---|
| 1,177,761 | A | * | 4/1916 | Clemmer ............ F16K 31/0679 |
| | | | | 251/129.1 |
| 1,384,443 | A | * | 7/1921 | Frey .................... F16K 31/0679 |
| | | | | 310/15 |
| 1,822,388 | A | * | 9/1931 | Beede ............... F16K 31/52408 |
| | | | | 251/259 |
| 3,052,828 | A | * | 9/1962 | Phinizy ................. H01F 7/1607 |
| | | | | 310/23 |
| 5,365,210 | A | | 11/1994 | Hines |
| 5,504,468 | A | * | 4/1996 | Hattori ................. H01F 7/1607 |
| | | | | 335/278 |
| 6,644,330 | B1 | * | 11/2003 | Chen ................... F16K 17/0413 |
| | | | | 137/614.21 |

OTHER PUBLICATIONS

International Preliminary Report on Patentability mailed Nov. 8, 2022, issued in corresponding International Application No. PCT/EP2021/061702, filed May 4, 2021, 6 pages.

International Search Report mailed Jul. 21, 2021, issued in corresponding International Application No. PCT/EP2021/061702, filed May 4, 2021, 6 pages.

Written Opinion mailed Jul. 21, 2021, issued in corresponding International Application No. PCT/EP2021/061702, filed May 4, 2021, 5 pages.

\* cited by examiner

MANUALLY CONTROLLED ELECTROMAGNETIC ACTUATOR AND PARKING BRAKE VALVE PROVIDED WITH SUCH AN ACTUATOR

The invention relates to the field of electromagnetic actuators and more particularly to a manually controlled bistable electromagnetic actuator, as well as to an aircraft parking brake valve comprising such an actuator.

BACKGROUND OF THE INVENTION

In general manner, an aircraft wheel brake comprises friction elements, some of which are secured to the wheel and others of which are secured to a stator, and a hydraulic brake actuator or "jack" arranged to exert sufficient exertion on the friction elements to prevent the aircraft wheel from rotating.

When parked, the brake jack is activated by a dedicated control device (referred to herein as the "parking brake system") that is distinct from the device for controlling the brake actuator while landing. The parking brake system comprises a hydraulic distributor commonly referred to as park brake selector valve (PBSELV) or park brake shut-off valve (PBSOV) having a check valve or a slide valve that is generally moved by an electromechanical actuator.

The electromechanical actuator comprises an electric motor having a stator and a rotor, and a screw-and-nut assembly having one of its elements driven in rotation by the rotor and its other element constrained to slide without rotating between two positions in order to control the movement of the slide valve or of the check valve.

The gear formed by the screw/nut assembly is deemed to be irreversible so that this type of actuator does not make it possible to manually control the movement of said check valve or of said slide valve. However, for maintenance reasons, it would be advantageous to be able to control the PBSELV/PBSOV distributor in the absence of electricity.

It would also be advantageous to be able to manually control the parking brake in the event of an electrical failure or electronic malfunction.

OBJECT OF THE INVENTION

The object of the invention is therefore to propose a linear actuator that can be controlled both electrically and manually to drive a distributor such as that of an aircraft parking brake system.

SUMMARY OF THE INVENTION

To this end, is provided, according to the invention, a bistable electromagnetic actuator comprising:
  a housing extending along an exertion axis of the actuator,
    two excitation coils arranged inside the housing and comprising at least one winding around the exertion axis for generating a magnetic control flux,
  a core that can be moved along the exertion axis and immobilised in two end positions depending on the magnetic flux generated by the coils,
  an actuating member coupled to the core to form a movable assembly, and
  a manual control device comprising a drive shaft mounted such that it can rotate about a first axis orthogonal to the exertion axis, the drive shaft comprising at least one tooth engaging with at least one first raised part translationally connected to the actuating member such that rotation of the drive shaft generates translational movement of the movable assembly.

The gear formed between the movable assembly and the drive shaft is reversible. The actuating member can thus be moved by energizing the coil or rotating the drive shaft so that the actuator can be controlled both electrically and manually.

In particular manner, the actuating member comprises a rod extending along the exertion axis.

According to a particular characteristic, the manual control device comprises a handle arranged at an end of the drive shaft for rotating said drive shaft.

According to another particular characteristic, the actuator further comprises a copy shaft mounted such that it can rotate about a second axis orthogonal to the exertion axis. The copy shaft comprises a tooth engaging with said at least one first raised part or with at least one second raised part of the actuating member such that a translation of the member of the movable assembly rotates the copy shaft.

In particular, the actuator comprises a permanent magnet carried by the copy shaft, and a Hall effect sensor arranged for detecting a magnetic field emitted by the magnet when the copy shaft is in an angular position corresponding to one of the end positions of the core.

The invention also provides an aircraft parking brake valve comprising such an actuator and a distribution element that is movable between two service positions. The actuation member is connected to the distribution element for controlling a movement of said distribution element between two service positions. In particular manner, the distribution element is a check valve or a slide valve.

BRIEF DESCRIPTION OF THE DRAWING

The invention can be better understood in the light of the following description, which is purely illustrative and non-limiting, and should be read with reference to the accompanying drawings, in which.

DETAILED DESCRIPTION OF THE INVENTION

Figure 1:
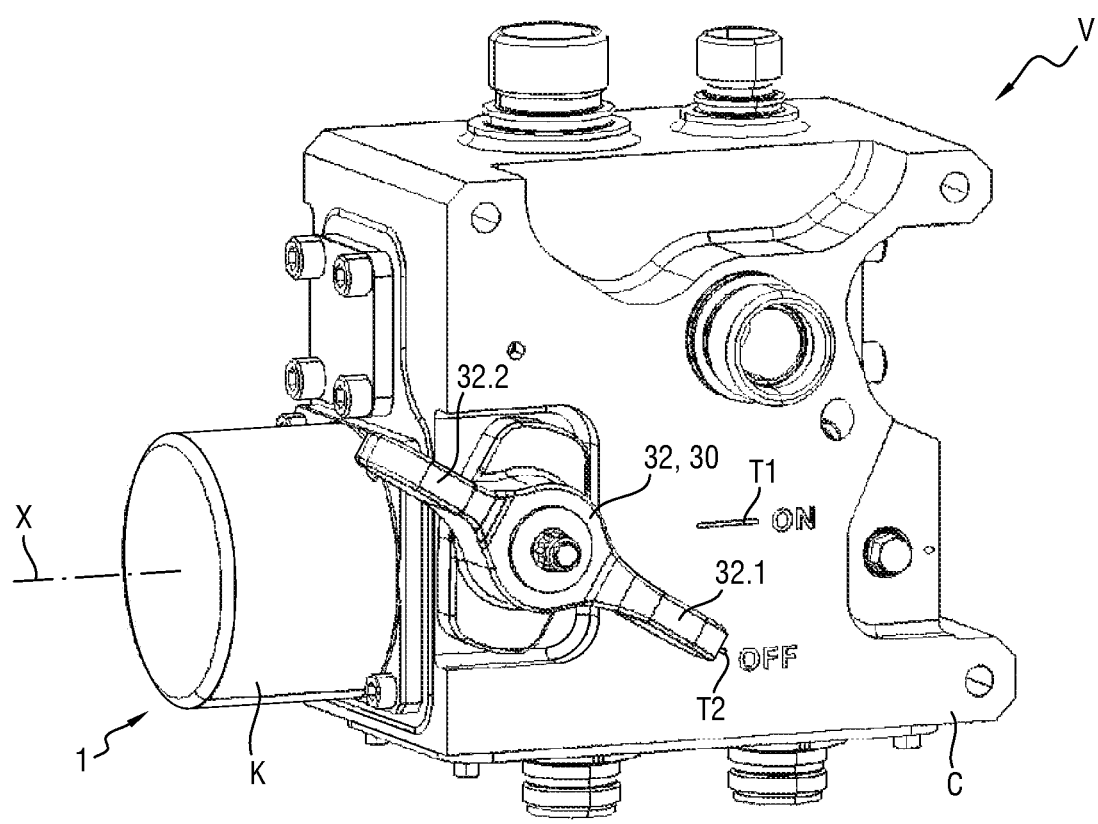
FIG. 1 is a perspective view of an aircraft parking brake valve comprising an actuator according to a particular embodiment of the invention.
Figure 2:
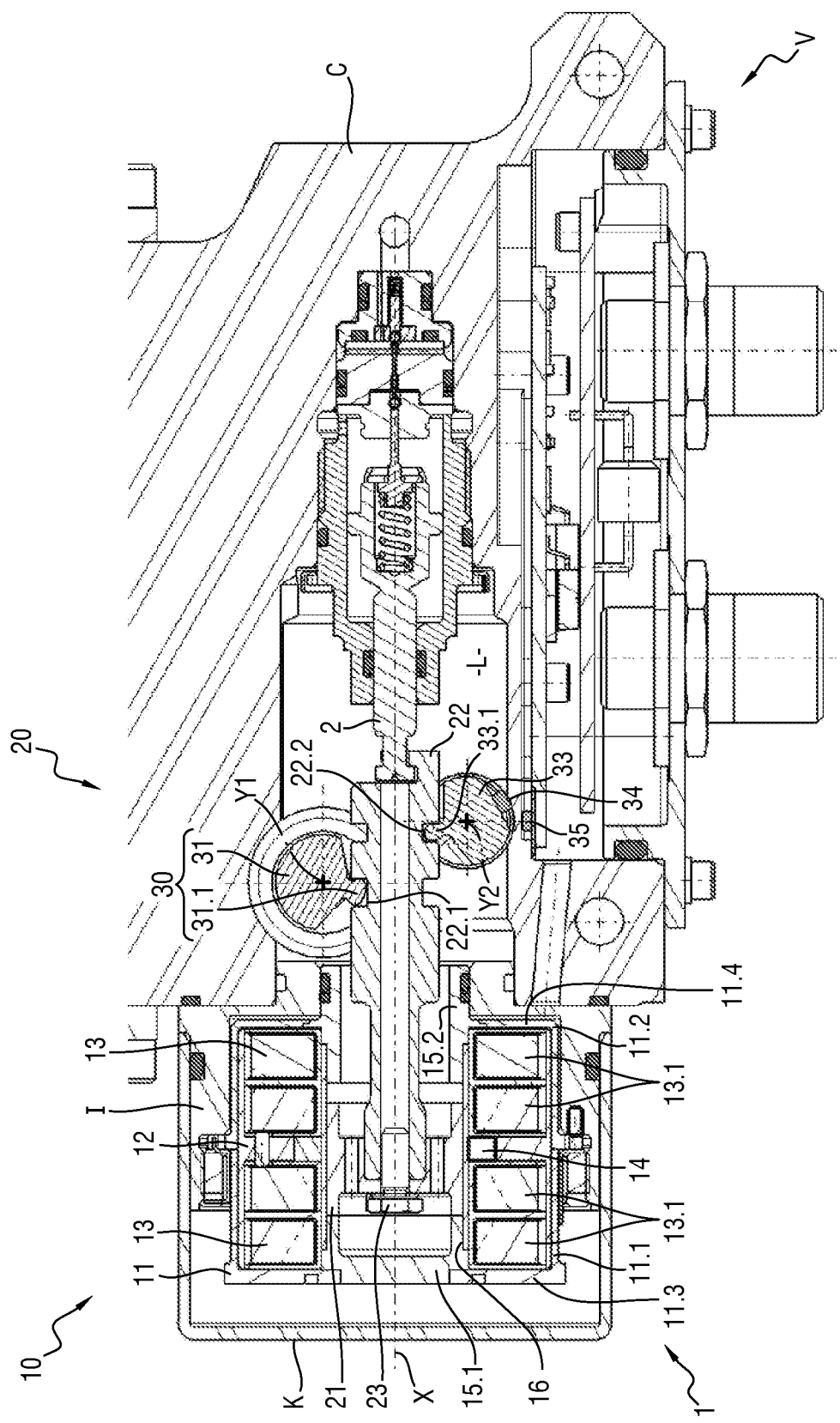
FIG. 2 is a sectional view of the valve shown in FIG. 1 according to a plane passing through an exertion axis of the actuator.

With reference to FIGS. 1 and 2, the invention relates to a bistable electromagnetic actuator, generally designated at 1, here controlling the movement of a distribution element 2 of an aircraft parking brake valve V between two service positions.

The actuator 1 comprises, in a particular embodiment of the invention, a fixed assembly designated in general terms by the reference 10, and a movable assembly designated in general terms by the reference 20.

The fixed assembly 10 has a generally cylindrical shape around a longitudinal axis X and comprises, from the outside towards the inside, a housing 11, a support 12 for permanent magnets, two electromagnetic excitation coils 13, a set of four permanent magnets 14, two magnetic endpieces 15.1, 15.2 and a tube 16 made of non-magnetic material.

The housing 11 is made of ferromagnetic material and comprises a tubular body in two parts 11.1, 11.2 extending successively along the axis X. Each of the body parts 11.1, 11.2 is provided at its free end with a rim 11.3, 11.4 perpendicular to the axis X, each defining an end opening of the housing 11.

The two coils 13 are each housed in an internal volume of the permanent magnet support 12 and are carried by said support so as to be centered on the axis X. Each coil 13 comprises two respective windings 13.1.

The permanent magnet support 12 keeps the coils 13 spaced apart from each other and is captive to the body parts 11.1, 11.2. The permanent magnet support 12 is made of ferromagnetic material.

The permanent magnets 14 are symmetrically distributed around the axis X between the coils 13 and are bonded inside the support 12 for generating a permanent magnetic flux in the absence of current in said coils 13.

The magnetic endpieces 15.1, 15.2 are coaxial with respect to the axis X and are positioned in the housing 11 in contact with the coils adjacent the longitudinal ends of said housing 11. The endpiece 15.1 closes the end opening defined by the rim 11.3. The endpiece 15.2 comprises a portion projecting from the end opening defined by the rim 11.4. Each endpiece 15.1, 15.2 has a tubular shape centered on the axis X and forms a stop for the sliding of the movable assembly 20. The endpieces 15.1, 15.2 are made of ferromagnetic material in order to guide the magnetic flux produced by the coils 13 and guided by the housing 11 and the permanent magnet support 12.

The tube 16 is centered on the axis X and extends between the endpieces 15.1, 15.2 inside the permanent magnet support 12 to form a member for guiding the movable assembly 20.

The movable assembly 20 comprises a core 21 made of ferromagnetic material and a non-magnetic rod 22 coupled to the core 21 to form an actuating member.

The core 21 comprises a peripheral ring having radially extending therein a web for connection with the rod 22. The core 21 is able to slide along the axis X inside the tube 16 between two end positions in which said core 21 is partially opposite the coils 13 and bears against one of the endpieces 15.1, 15.2. The endpieces 15.1, 15.2 thus form stops and also make it possible to close up the magnetic flux from the coils 13 towards the core 21.

Figure 3:
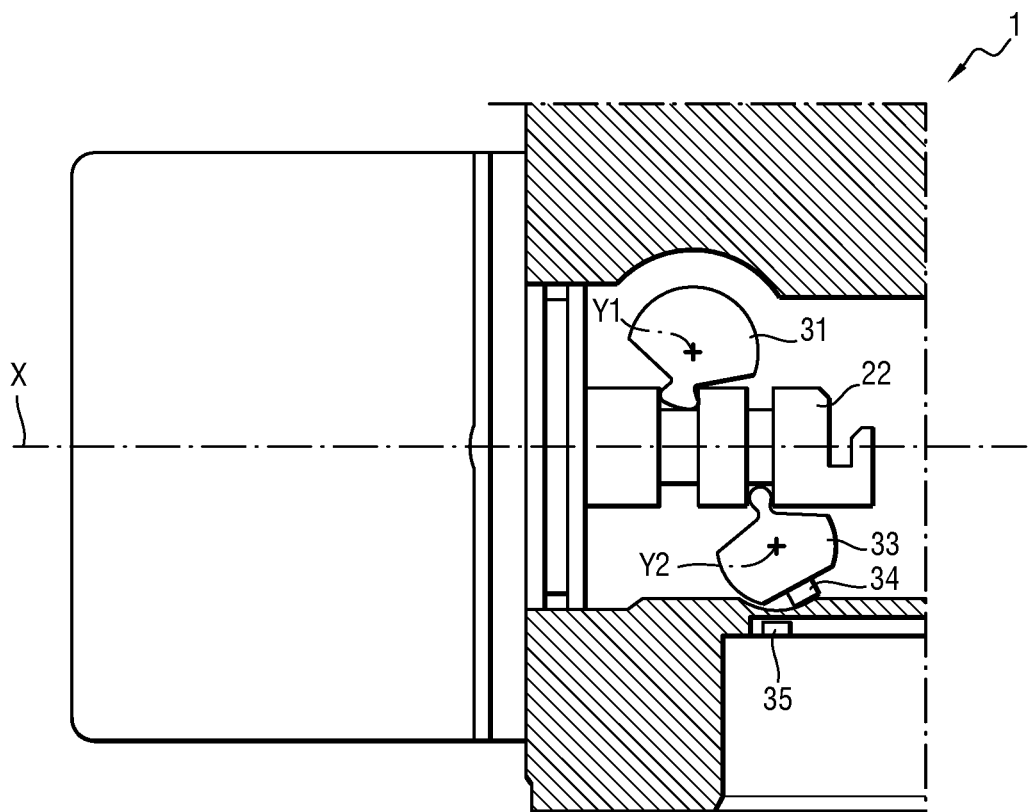
FIG. 3 is a simplified section view of the actuator shown in FIG. 2, in one of its stable states.
Figure 4:
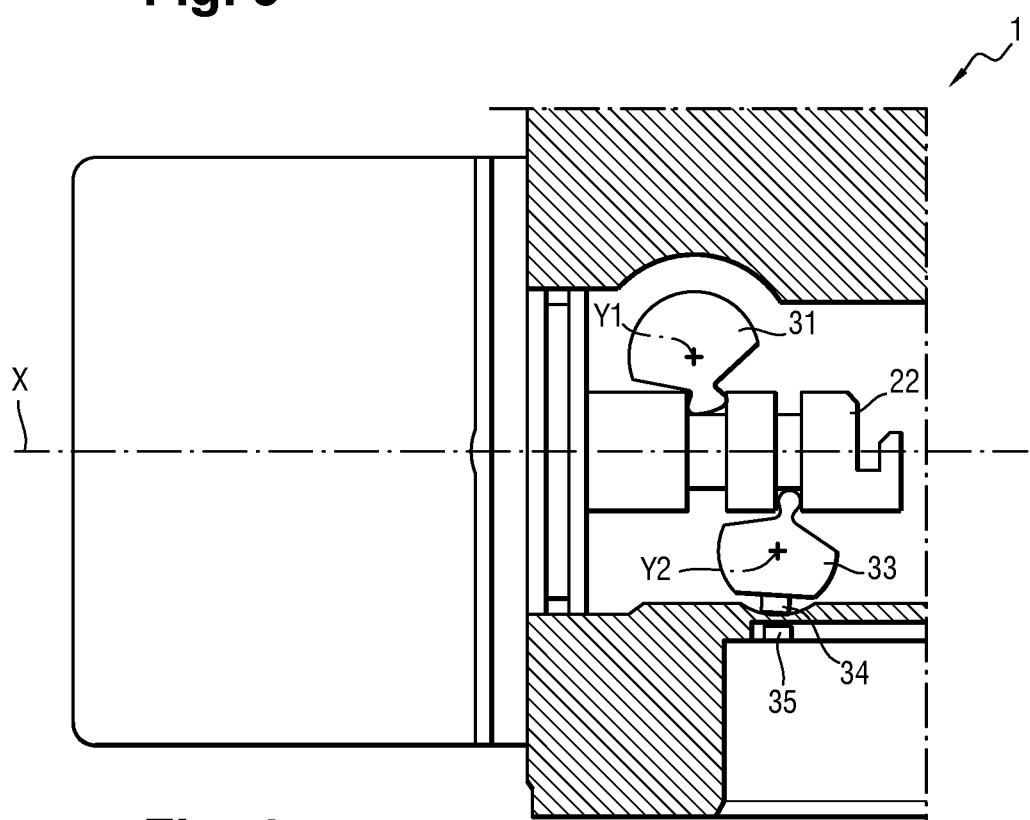
FIG. 4 is a view identical to FIG. 3, in which the actuator is in the other of its stable states.

The rod 22 has a generally cylindrical shape along the axis X. A proximal end of the rod is fixedly attached to the web of the core 21 by a screw 23 passing through said web at its center. The rod 22 can thereby be moved along the axis X between a retracted position (FIG. 3) and an extended position (FIG. 4) corresponding to the end positions of the core 21.

The rod 22 passes axially through an opening made in the endpiece 15.2 so that a distal end of the rod 22 projects from the fixed assembly 10. The distal end of the rod 22 comprises a connecting interface to be coupled to the distribution element 2, and is externally provided with an first annular groove 22.1 and a second annular groove 22.2.

The fixed assembly 10 of the actuator is fixedly fastened to a casing C of the valve V, via a fastening interface I made of non-magnetic material in which the housing 11 is accommodated, such that the proximal end of the rod 22 extends inside a receiving volume L delimited by internal walls of the casing C. The fixed assembly 10 extends partly projecting from the fastening interface, which is itself partly projecting from the casing C, and is capped by a cover K which is fastened to the fastening interface while extending projecting from the casing C.

The actuator 1 also comprises a manual control device 30 for manually moving the rod 22 between the retracted position and the extended position. The control device comprises a drive shaft 31 that can rotate around an axis Y1 that is orthogonal to the axis X. The drive shaft 31 passes through a side wall of the casing C and has an end that projects outside the casing C. The end of the drive shaft 31 is provided with a handle 32 (visible in FIG. 1) for driving the drive shaft 31 in rotation. The handle 32, in this case of a shape commonly called "butterfly", comprises two identical ears 32.1, 32.2 which extend symmetrically on either side of the axis Y1 and in a plane passing through said axis Y1. The ears 32.1, 32.2 form gripping means for driving the drive shaft 31 in rotation.

As can be seen in FIG. 2, the drive shaft 31 comprises a tooth 31.1 engaged in the first groove 22.1 of the rod 22 so that rotation of the drive shaft 31 around the axis Y1 causes the rod 22 to slide along the axis X towards the extended position or the retracted position depending on the direction of rotation of said drive shaft 31. Since the rod 22 is integrally fixed to the core 21, rotation of the drive shaft 31 also causes the core 21 to move towards one or the other of its end positions.

The tooth 31.1 has a rounded shape and, when the drive shaft 31 pivots, fits into a cylinder centered on the axis Y1 and having a diameter equal to an outside diameter of the drive shaft 31.

The handle 32 has an angular clearance defined directly by the retracted position and the position of the rod 22, and indirectly by the end positions of the core 21. As shown in FIG. 1, this angular clearance is shown by a first line T1 followed by the inscription "ON" and by a second line T2 followed by the inscription "off". The first line T1 corresponds to an extreme angular position of the handle 32 in which the ear 32.1 is in the extension of said first line T1 and the rod 22 is in the extended position. The second line T2 corresponds to an end angular position of the handle 32 in which the ear 32.1 is in the extension of said second line T2 and the rod 22 is in the extended position. The handle 32 thus makes it possible to have a visual indication of the position of the rod 22.

The actuator 1 further comprises a copy shaft 33 mounted in a wall of the casing C so as to have an end that can rotate inside the volume L around an axis Y2 orthogonal to the axis X. The axes Y1, Y2 are parallel. The copy shaft 33 and the drive shaft 31 extend on either side of the rod 22.

The end of the copy shaft 33 includes a tooth 33.1 engaged in the second groove 22.2 of the rod 22 so that sliding of the rod 22 along the axis X causes the copy shaft 33 to rotate around the axis Y2. The tooth 33.1 has a rounded shape and, during the rotation of the copy shaft 33, fits into a cylinder centered on the axis Y2 and of diameter equal to an external diameter of the copy shaft 33.

Moreover, a permanent magnet 34 is fixed on an external surface of the copy shaft 33 which is opposite the tooth 33.1, and a Hall effect sensor 35 is arranged inside the casing C so that the sensor 35 detects a magnetic field emitted by the magnet 34 when the copy shaft 33 is in an angular position corresponding to the extended position of the rod 22. The sensor 35 is connected to an electronic unit (not shown here) enabling, for example, information relating to the position of the rod 22, and therefore to a state of the valve V, to be reported to the cockpit of the aircraft.

There follows a description of the operation of the actuator.

In order to move the core 21 towards one or the other of its end positions, one of the two electromagnetic coils 13 is electrically powered so as to generate a magnetic field of attraction of the core 21. The other electromagnetic coil 13 is not electrically powered.

The magnetic field generated by the coil 13 produces a magnetic flux which is guided by the ferromagnetic parts of the actuator 1. The magnetic flux forms a loop and passes successively through the endpiece 15.1, 15.2 in contact with the electrically powered coil 13, the part 11.1, 11.2 of the housing 11 in contact with said endpiece 15.1, 15.2, the permanent magnet support 12, the permanent magnets 14 and the core 21. The core 21 then moves inside the tube 16 and is pressed against the corresponding endpiece 15.1, 15.2 of the fixed assembly 10. The core 21 is then spaced apart from the other endpiece 15.1, 15.2.

The passage of the core 21 towards one or other of its end positions causes the rod 22 to slide towards the retracted position or the extended position, and thus causes the distribution element 2 of the valve V to move between two positions in service. The sliding of the rod 22 in turn causes the drive shaft 31 to rotate and the copy shaft 33 to rotate.

When the rod 22 is in the extended position, the angular position of the copy shaft 33 is such that the permanent magnet 34 faces the sensor 35. The sensor 35 then detects the magnetic field emitted by the magnet 34, thereby enabling the electronic unit to inform the pilot of the aircraft that the valve V is in a state corresponding to the extended position of the rod 22.

When the rod 22 is in its retracted position, the angular position of the copy shaft 33 is such that the permanent magnet 34 is not facing the sensor 35. The sensor 35 then does not detect the magnetic field emitted by the magnet 34.

It is also possible to manually control the movement of the distribution element 2 by turning the handle 32 so as to effect a rotation of the drive shaft 31. The rotation of the drive shaft 31 causes the rod 22 to slide towards the extended position or the retracted position depending on the direction of rotation of the handle 32, which causes the distribution element 2 to slide along the axis X towards one or other of its service positions.

Naturally, the invention is not limited to the described embodiments, but covers any variant coming within the scope of the invention as defined by the claims.

The drive shaft 31 and the copy shaft 33 do not necessarily extend parallel to each other.

Although there the drive shaft 31 and the copy shaft 33 are on either side of the rod 22, they may also extend on the same side of the rod 22.

The tooth 31.1 of the drive shaft 31 and the tooth 33.1 of the copy shaft 33 can be engaged in a single groove 22.1.

By way of example, the distribution element 2 may be a check valve or a slide valve.

The shape and the dimensions of the rod 22 may be different from those described and illustrated.

Each of the grooves may be replaced by at least one relief. By way of example, it is possible to provide a rack on the rod 22 and toothed wheels on the drive shaft and the copy shaft.

Each of the grooves may be formed on the actuating member, the core or any other part translationally connected to the actuating member.

The drive shaft may itself be provided with a magnet to also act as a copy shaft.

The invention can be used for any type of actuator whatever the device that is actuated.

The invention claimed is:

1. A bistable electromagnetic actuator comprising:
   a housing extending along an exertion axis (X) of the actuator;
   two excitation coils arranged inside the housing, each coil comprising at least one winding around the exertion axis and configured to generate a magnetic control flux;
   a core that is selectively moveable along the exertion axis and immobilized in two end positions depending on the magnetic control flux generated by the coils;
   an actuating member coupled to the core to form a movable assembly; and
   a manual control device comprising a drive shaft mounted such that it can rotate about a first axis (Y1) orthogonal to the exertion axis, the drive shaft comprising at least one tooth engaging with at least one first raised part translationally connected to the actuating member such that rotation of the drive shaft generates translational movement of the movable assembly.

2. The bistable actuator according to claim 1, wherein the actuating member comprises a rod extending along the exertion axis.

3. The bistable actuator according to claim 1, wherein the control device comprises a handle arranged at an end of the drive shaft and configured to rotate said drive shaft.

4. The bistable actuator according to claim 1, further comprising a copy shaft mounted to be rotatable about a second axis (Y2) orthogonal to the exertion axis (X), the copy shaft comprising a tooth engaging with the at least one first raised part or with at least one second raised part of the actuating member such that a translational movement of the movable assembly rotates the copy shaft.

5. The bistable actuator according to claim 4, further comprising a permanent magnet carried by the copy shaft, and a Hall effect sensor arranged to detect a magnetic field emitted by the magnet when the copy shaft is in an angular position corresponding to one of the end positions of the core.

6. An aircraft parking brake valve (V) comprising an actuator according to claim 1, and a distribution element that is movable between two service positions, the actuating member being connected to the distribution element and being configured to control a movement of said distribution element between two service positions.

7. The aircraft parking brake valve (V) according to claim 6, wherein the distribution element is a check valve or a slide valve.

* * * * *